United States Patent
Kalhan et al.

(10) Patent No.: US 7,123,917 B2
(45) Date of Patent: Oct. 17, 2006

(54) SYSTEM AND METHOD FOR DETERMINING WHEN TO EXIT AN EXISTING WIRELESS COMMUNICATIONS COVERAGE NETWORK

(75) Inventors: Amit Kalhan, San Diego, CA (US); Tariq Hassan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 533 days.

(21) Appl. No.: 10/321,261

(22) Filed: Dec. 17, 2002

(65) Prior Publication Data

US 2004/0116133 A1   Jun. 17, 2004

(51) Int. Cl.
*H04Q 7/20* (2006.01)

(52) U.S. Cl. .................. 455/437; 455/440; 455/442

(58) Field of Classification Search ............. 455/456.2, 455/432.1, 436, 445, 442, 439, 552.1, 437, 455/440, 441

See application file for complete search history.

(56) References Cited

U.S. PATENT DOCUMENTS

| | | | | |
|---|---|---|---|---|
| 6,115,608 | A * | 9/2000 | Duran et al. | 455/436 |
| 6,275,703 | B1 * | 8/2001 | Kalev | 455/436 |
| 6,504,828 | B1 * | 1/2003 | Corbett | 370/331 |
| 6,615,044 | B1 * | 9/2003 | Artamo et al. | 455/437 |
| 6,721,565 | B1 * | 4/2004 | Ejzak et al. | 455/436 |
| 6,745,034 | B1 * | 6/2004 | Wang et al. | 455/441 |
| 6,754,493 | B1 * | 6/2004 | Jetzek | 455/436 |
| 2002/0119779 | A1 * | 8/2002 | Ishikawa et al. | 455/437 |
| 2003/0114158 | A1 * | 6/2003 | Soderbacka et al. | 455/436 |

FOREIGN PATENT DOCUMENTS

| | | |
|---|---|---|
| BE | 904398 A | 6/1986 |
| EP | 0966173 A | 12/1999 |
| EP | 0966173 | 10/2002 |
| WO | WO 96/13950 A | 5/1996 |

OTHER PUBLICATIONS

Choi et al., Sequential Handoff Algorithm for Cellular Mobile Communication, Global Telecommunications Conference, pp. 716-719 (1997).

* cited by examiner

*Primary Examiner*—Edward F. Urban
*Assistant Examiner*—Blane J. Jackson

(57) ABSTRACT

A system and a method are presented for determining when to exit an existing wireless communications coverage network. The method comprises: sampling received input power levels; measuring the difference between the received input power level samples and a predetermined baseline threshold value; adjusting an indicator based on the received input power level samples compared to the predetermined baseline threshold value; setting a terminal condition indicating when the wireless communications device should exit the existing wireless communications coverage network; and exiting the existing coverage network based on a comparison of the indicator to the terminal condition.

38 Claims, 14 Drawing Sheets

SYSTEM AND METHOD FOR DETERMINING WHEN TO EXIT AN EXISTING WIRELESS COMMUNICATIONS COVERAGE NETWORK

BACKGROUND OF THE INVENTION

1. Field of the Invention

This invention relates generally to wireless communications devices and, more particularly, to a system and method for making a determination of whether to stay with an existing wireless communications coverage network.

2. Background

A key concern for wireless communications devices (referred to herein interchangeably as a mobile handset) is acquiring coverage with the highest probability of providing a good grade of service. Within a cellular network, often a mobile handset finds itself in a coverage zone on an edge of a cell site, often characterized by a low power limit on the forward link (i.e., transmission from the cell site or base station), and sometimes a non detected reverse link (i.e., transmission from the mobile handset). This coverage zone is sometimes referred to as the Grey Zone.

To better understand the problems associated with the Grey Zone, FIG. 1A illustrates a mobile handset 100 operating in a cellular network with at least one base station 105. Base station 105 transmits a signal represented by signal strength 110 that diminishes log-normally as a function of distance. FIG. 1A shows "distance from base station" plotted along the horizontal axis. However it will be understood by those of skill in the art that other factors besides distance to the base station 105 effect the signal strength received by the handset. For example, an object such as a hill, or a car may effect the signal strength. As another example, variations in air density can effect the signal strength. Distance from the base station 105 is used herein as a shorthand for all of the cases that can effect the signal strength.

At some position 115, the mobile handset 100 may be too far from the base station 105, such that the base station 105 cannot detect the mobile handset's 100 transmission. The base station 105 is less limited in the power it can transmit than the mobile handset 100 and therefore can send a strong enough signal that the mobile handset 100 can detect, but at the same time the base station 105 may not detect a signal from the mobile handset 100. In this situation where only the base station 105 is transmitting detectable signals, the mobile handset 100 cannot make a call. This area is called the Grey Zone.

To overcome this problem, current wireless standards implement a strict threshold, that if met, switches the mobile handset 100 from the current network (i.e., base station 105) in search of another network. For example, the Mobile Station-Base Station Compatibility Standard for Dual-Mode Spread Spectrum Systems (commonly know as TIA/EIA-95-B) uses two thresholds: the Ec threshold and Ec/Io threshold, to determine when to seek an alternative network. The Ec threshold and Ec/Io threshold stand for the pilot power threshold and the pilot Ec/Io threshold respectively. See TIA/EIA-95-B at Sec. 6.6.2.2.5. In practice, the mobile handset 100 determines the pilot signal strength and the signal-to-noise ratio of the pilot signal (the SNR) from the signal levels transmitted by the base station 105. The mobile handset 100 also receives a data message from the base station 105 that includes the Ec threshold and the Ec/Io threshold set by the network.

The mobile handset 100 compares the pilot signal strength to the Ec threshold and the SNR to the Ec/Io threshold. In one implementation, if either exceeds the threshold, the mobile handset 100 will seek an alternate network. In another implementation, if both thresholds are exceeded, the mobile handset 100 will seek an alternate network. The strict threshold comparison effectively creates a threshold 120, such that when the mobile handset 100 crosses to the right of the threshold 120, the mobile handset 100 switches from the existing network and seeks alternate coverage.

The problem with this strict threshold comparison method is that it may result in switching from a base station 105 prematurely. Because the pilot signal and the SNR are both functions of position, among other factors, and a mobile handset 100 can change position rapidly, using a strict comparison to thresholds could result in changing base stations too rapidly, and potentially degrading the quality of service. To illustrate, consider a mobile handset 100 traveling on a windy road that at time one is at distance 125. At some short time later, the mobile handset 100 is at distance 130. As it continues is travel, the mobile handset 100 vacillates between distance 125 and distance 130. Both the pilot signal and the SNR for distance 125 may favor base station 105, while the both pilot signal and SNR for distance 130 exceed the relevant thresholds (i.e., threshold 120). The mobile handset 100 using a strict threshold comparison would switch from the base station 105 upon determining that the thresholds were exceeded, and the mobile handset 100 would seek alternative service. This switch may result in diminished service, if for example, alternate service is not available to the mobile handset 100.

Additionally, as mentioned above, the RF level is dynamic and can often oscillate by several dB even when the mobile handset 100 is in a stationary position. The oscillations in the RF level are caused by environmental effects in the area. As a result, even if the mobile handset 100 is positioned on the left side of point 120 in FIG. 1A the received signal strength may cross below the Ec threshold or the Ec/Io threshold at a short distance from the point 120 on FIG. 1A. The hard decision threshold will cause the mobile handset 100 to switch current networks prematurely and results in diminished service.

A similar problem exists when a mobile handset 100 is caught between two competing base stations. FIG. 1B illustrates mobile handset 100 in a network that includes at least two base stations 105 and 135. As discussed above, base station 105 transmits a signal represented by signal strength 110, and similarly, base station 135 transmits a signal represented by signal strength 140. Both signal strengths 110 and 140 diminish log-normally as a function of distance.

Most current methods use the SNR to select between base station 105 and base station 135. For example, if the mobile handset 100 were located at distance 145 (i.e., significantly, closer to base station 105 than base station 135), then the SNR would clearly favor base station 105 and the mobile handset 100 would select base station 105. Similarly, at distance 150, the mobile handset 100 would select base station 135.

As with the situation described above with reference to FIG. 1A, because the SNR is a function of position, among other factors, and a mobile handset 100 can change position rapidly, using strictly a comparison of SNR of competing base stations 105 and 135 could result in changing base stations too rapidly, and potentially degrading the quality of service. To illustrate, consider a mobile handset 100 traveling on a windy road that at time one is at distance 155. At some short time later, the mobile handset 100 is at distance 160. As it continues its travel, the mobile handset 100 vacillates between distance 155 and distance 160. The SNR for distance 155 may favor base station 105, while the SNR for distance 160 may favor base station 135. The mobile handset 100 would then constantly switch between the two base stations. The constant switching may result in occupying additional resources, increased standby time, and other problems, ultimately decreasing service quality. This possibility must be weighed against the benefit of the slightly more beneficial SNR. When, as in distance 155 and distance 160, the SNR difference is likely very small, the possible costs of switching outweigh the benefits.

To overcome this potential over-switching problem, it is known in the art to not simply compare the SNRs, but rather to compare the SNRs plus some Delta. For example, if the mobile handset 100 is at distance 160 and currently using base station 105, the mobile handset 100 would change to base station 135 if and only if:

$$SNR(\text{at base station } 105) + \text{Delta} < SNR(\text{at base station } 135)$$

Thus, the Delta makes it preferable to stay on the existing base station, unless and until the signal quality drops to a point where it is clearly less desirable than another received base station signal. The Delta effectively sets up two thresholds 165 and 170, where the mobile handset 100 will always select base station 105 if the mobile handset 100 is located to the left of threshold 165 and base station 135 if located to the right of threshold 170. If the mobile handset 100 is located between thresholds 165 and 170, the mobile handset 100 will not switch.

At least two significant problems exist with the SNR comparison method described above and illustrated in FIG. 1B. The first problem is that the SNR comparison, even with the Delta, may result in switching base stations (either 105 or 135) too often. As illustrated above, the mobile handset 100 may be on a winding road that may take to a distance 150, for a very short time, whose SNR (plus the Delta) favors switching the base station, from say base station 105 to base station 135. But the mobile station 100 winds back to a distance 175 where the SNR favors the base station 105, again causing a switch. Despite the fact that the mobile handset 100 only went to distance 150 briefly, the mobile handset 100 still made the switch. This is similar to the premature switching problem described with reference to FIG. 1A.

A second problem is that the mobile handset 100 may not switch to the most favorable base station (either 105 or 135) when in the area between the thresholds 165 and 170. For example, as described above a mobile handset 100 currently using base station 105 may move to distance 160 and come closer and closer to threshold 170, but never crossing threshold 170. At a position approaching threshold 170, it would be advantageous to switch to base station 135. The method described above, however would not switch to base station 135, but would remain with base station 105 because the SNR of base station 135 would not overcome the SNR, including the Delta, of base station 105. Thus, the mobile handset 100 would not operate with the most favorable base station that yields the best service.

Given the problems detailed with reference to FIGS. 1A and B, it would be advantageous if a mobile handset 100 could accurately determine when to exit the existing coverage network so as ensure best possible service and to avoid premature or late exits.

SUMMARY OF THE INVENTION

The present invention solves the problem of determining when a mobile handset operating in a Grey Zone should exit the existing coverage network. The present invention recognizes that a mobile handset should analyze the received input power to determine when it is necessary to exit. The invention performs this analysis by compiling the received input power, comparing the received input power to a threshold, adjusting an indicator depending on that comparison, and determining whether to exit the existing coverage network or not based on the state of the indicator with respect to a terminal condition.

In the examples that follow the terminal condition will be a terminal value. The state of the indicator will be less than, greater than, or equal to the terminal value. The method determines whether to exit the existing coverage network or not based on the state of the indicator with respect to the terminal value.

An example of this method would include adjusting the indicator through addition and subtraction. This example comprises: sampling received input power levels; assigning an adjustment factor based on a comparison of the received input power level samples and a predetermined baseline threshold value; beginning at a predetermined initial value, maintaining a running sum indicator of the value; and exiting the existing wireless communications coverage network based on the running sum indicator. Further refinements to the method include assigning a value of "−1" to the adjustment factor if the received input power level is greater than a predetermined minimum value or assigning a value of "+1" to the adjustment factor if the received input power level is less than a predetermined minimum value. Thus the running sum indicator will decrement if most of the received input power level samples are greater than the predetermined minimum value. Likewise, the running sum indicator will increment if most of the received input power level samples are less than the predetermined minimum value. Ultimately, the running sum indicator is an indication of the history of the received input power level. Based on this history a decision is made whether to exit the existing coverage network. If for example, the running sum indicator reaches or exceeds a preset value, then the mobile handset may exit the existing coverage network.

The method is not limited to simple addition and subtraction as a means for numerically indicating the history of the received input power level. For example, the method could adjust the indicator through a multiplication and division adjustment factor. In this example, the method may set an indicator value at an initial value. The indicator value would be multiplied by an adjustment factor if the received input power level is less than a predetermined minimum value or divided by an adjustment factor if the received input power level is greater than a predetermined minimum value. Thus the indicator will increase if most of the received input power level samples are less than the predetermined minimum value, or decrease if most of the received input power level samples are more than the predetermined minimum value. Ultimately, the indicator is an indication of the history of the received input power level. Based on this history a decision is made whether to exit the existing coverage network. If for example, the running sum reaches or exceeds a preset value, then the mobile handset may exit the existing coverage network.

In the examples discussed above, the method may increase its sensitivity by weighing the adjustment factors differently based on the distance from the threshold. For example, instead of assigning a "+/−1" to the adjustment factor, the method may assign a "+/−3" if the detected signal is a certain distance from the threshold. Thus, if the method experiences a series of very weak signals, the indicator would increase more rapidly (as compared to the "+/−1" example) and reach or exceed a preset value, causing the system to exit the existing coverage network. Similarly, the multiplication and division adjustment factor in the second example could be larger for weak received signals, causing the system to exit the existing coverage network more quickly.

The use of the present invention method enables a mobile handset operating in Grey Zone coverage to more accurately determine when to exit an existing coverage network to avoid the problems associated with premature or late exit from the coverage network. Additional details of the above-described method and a system for determining when to exit an existing coverage network are presented below.

DETAILED DESCRIPTION OF THE PREFERRED EMBODIMENTS

The present method solves the problems associated with the Grey Zone (i.e., maintaining the best service while avoiding premature or late exits) by compiling the received input power, comparing the compiled received input power to a threshold, adjusting an indicator depending on that comparison, and determining whether to exit the existing coverage network or not based on the indicator. While the invention is described below in the context of a mobile handset in a cellular network, it may also be used in any device that maintains a two-way communication via wireless signals. Examples of two-way communications via wireless signals include but are not limited to Global System for Mobile Communications (GSM) communications systems, Institute of Electrical Engineers, Inc. (IEEE) standard number 802.11 compliant communications systems, and Code Division Multiple Access (CDMA) communications systems.

Figure 1A:
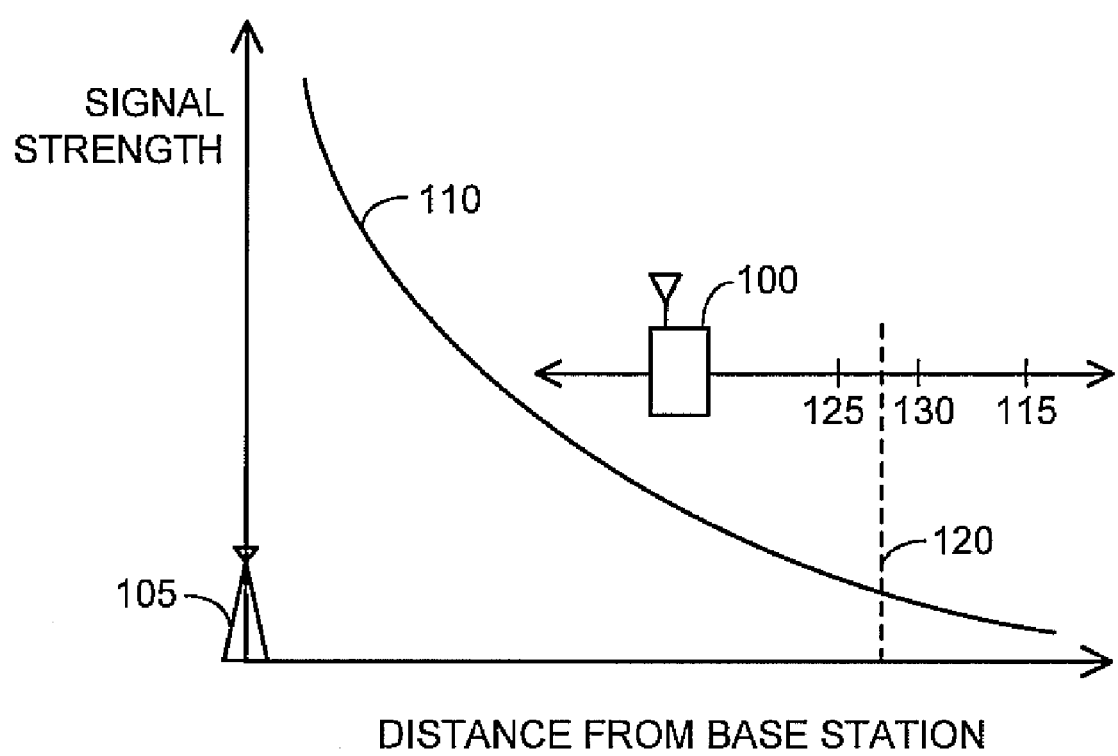
FIG. 1A is a graph showing received input power level signal strength for a mobile handset plotted against the distance of the device from a single base station.
Figure 1B:
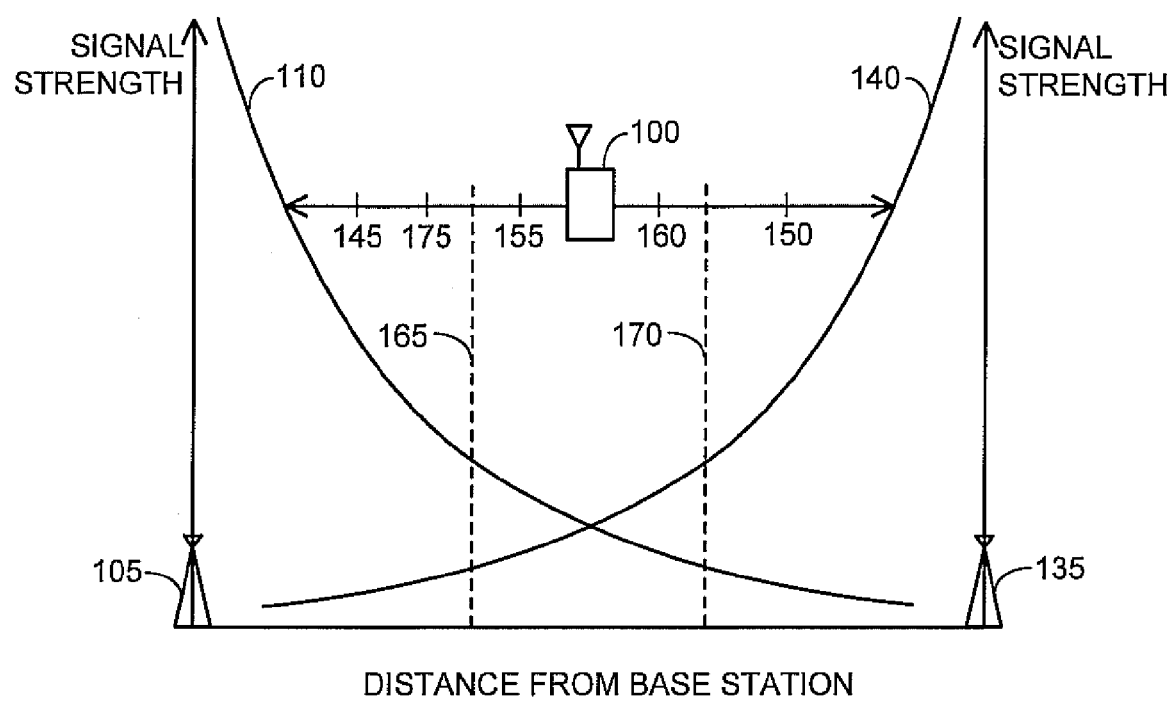
FIG. 1B is a graph showing received input power level signal strength for a mobile handset plotted against the distance of the device from two base stations.
Figure 2:
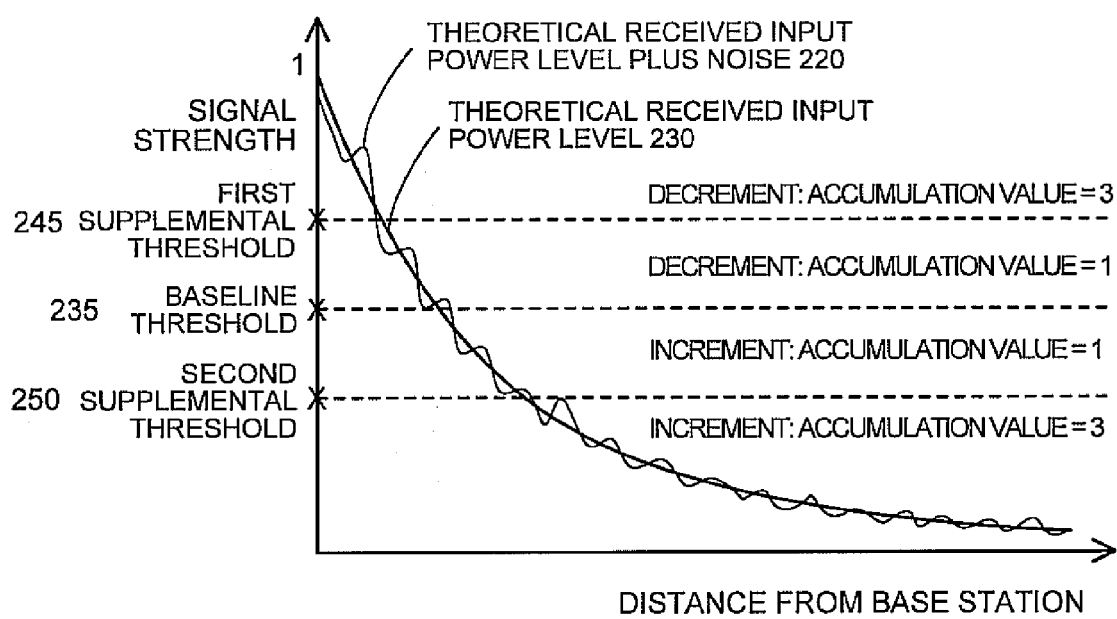
FIG. 2 is a graph showing received input power level signal strength for a mobile handset plotted against the distance of the device from a base station.

Before describing the various preferred embodiments, it is helpful to look at the signal strength received by a mobile handset. FIG. 2 is a graph showing received input power level signal strength for a mobile handset plotted against the distance of the device from a base station. The received input power level signal strength is equal to the theoretical received input level plus noise 220 and is the sum of the total mean received power and is normalized to a value of one, thus it has no actual units. FIG. 2 assumes the signal strength falls off log normally with distance from the base station. While this assumption is common to one of ordinary skill in the art, it is not necessary for the function or operation of the present invention. A baseline threshold 235 is also shown in FIG. 2. The value of the baseline threshold 235 can be selected according to the desired performance of the system. One possible value is the approximate threshold for minimally satisfactory operation of the mobile handset in the Grey Zone. That is, sample values less than the threshold indicate a trend toward unsatisfactory operation in the Grey Zone, and values greater than the threshold indicate a trend toward satisfactory operation in the Grey Zone. The device should exit if it is consistently operating below the baseline threshold 235.

Another possible way of setting the threshold is using the following open loop estimate of required power for an access channel transmission derived from TIA/EIA-95-B, Sec. 6.1.2.3.1: K-Mean Pwr Rcvd by Mobile(dBm)=Mean Pwr Trns by Mobile(dBm) where K=−73 dBm for Cellular CDMA and the maximum power transmitted by the Mobile for Cellular CDMA is 24 dBm.

The above equation yields a threshold of −97 dBm for Cellular CDMA operating under the IS-95-B standard; thus the mobile handset can set an appropriate threshold level that would ensure an access channel transmission. Other communications standards, bands and modes may require different threshold values for an access channel transmission.

The graph of FIG. 2 shows theoretical received input power level 230 for a handset plotted against distance of the device. The graph also includes theoretical received input power plus noise 220. It is common to one of skill in the art to model noise as a Gaussian distribution with zero mean. The theoretical received input power level plus noise 220 can also be modeled as a Gaussian distribution. Other, non-Gaussian models can be used to model input power levels.

In another method of selecting the baseline threshold 235, the baseline threshold 235 is assigned a value that is the mean of the Gaussian distribution of the theoretical received input power level plus noise 220 at some distance from the base station. The baseline threshold 235 supplemental thresholds may be used. The first supplemental threshold 245 is set equal to the baseline threshold 235 plus one standard deviation of the Gaussian distribution representing the noise. The second supplemental threshold 250 is set equal to the baseline threshold 235 minus one standard deviation of the Gaussian distribution representing the noise. It should be noted that one standard deviation of the Gaussian distribution representing the noise is equal to one standard deviation of the Gaussian distribution of the theoretical received input power level plus noise 220.

It will be clear to one of skill in the art that additional supplemental thresholds are possible. For example, a supplemental threshold can be placed at two or more standard deviations above and below the baseline threshold 235 of the Gaussian distribution representing the noise. It will also be clear to one of skill in the art that the supplemental thresholds do not have to be placed an integral number of standard deviations above and below the baseline threshold 235 of the Gaussian distribution representing the noise. The supplemental threshold does not have to be based on a standard deviation. Additional methods of picking the supplemental thresholds will be discussed below.

By compiling historical received input power level sample values, a mobile handset can identify the longer-term trends associated with received input power levels, such as steadily decreasing or increasing values, which are more accurate indicators of the quality of the coverage for the mobile handset.

Figure 3:
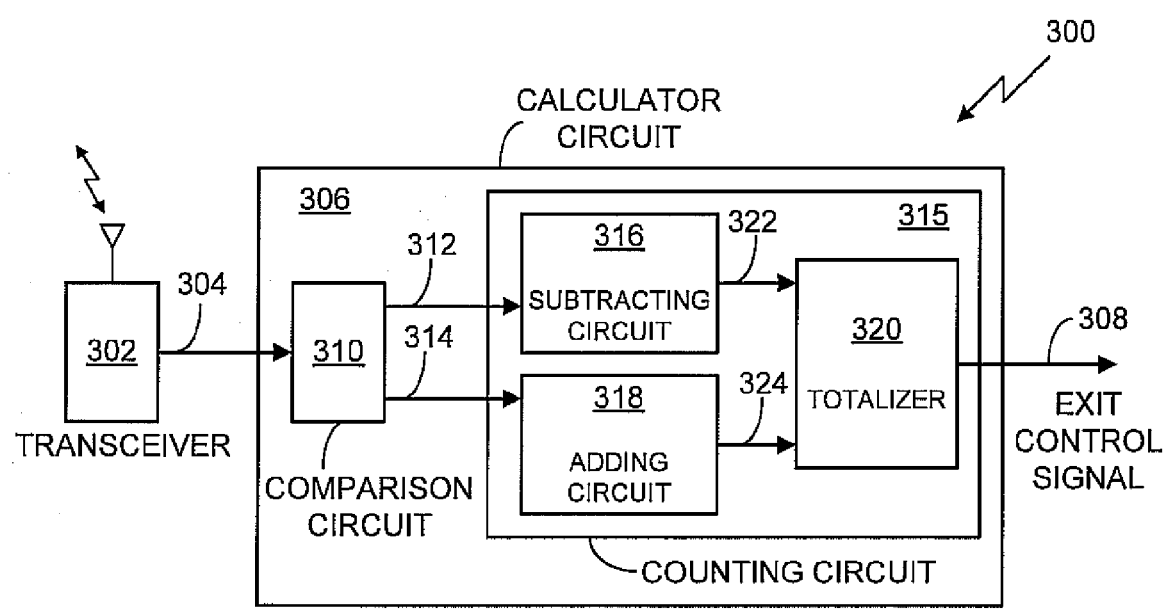
FIG. 3 is a schematic block diagram depicting a system for determining when to exit an existing coverage network.

FIG. 3 is a schematic block diagram depicting a system 300 for determining when to exit an existing coverage network in accordance with the present invention. Transceiver 302 has a transceiver output 304 supplying received input power level sample values to a calculator circuit 306. The calculator circuit 306 compiles historical data on the received input power level sample values and supplies an exit control signal 308 in response to the historical data and a predetermined baseline threshold 235 value. The calculator circuit 306 includes a first comparison circuit 310 with an input 304 accepting the received input power level sample values from the transceiver 302. The first comparison circuit 310 measures the difference between each received input power level sample value and the baseline threshold 235 value, and in response supplies decrement and increment control signals. The first comparison circuit 310 supplies a comparison signal responsive to the comparison of the input power levels signal to a threshold. The comparison signal is in the form of a first decrement control signal on line 312 and a first increment control signal on line 314. The first comparison circuit 310 supplies a first decrement control signal on line 312 if the received input power level sample value is greater than, or equal to the baseline threshold 235 value. Alternately, the fist comparison circuit 310 supplies a first increment control signal on line 314 if the received input power level sample value is less than the baseline threshold 235 value.

The calculator circuit 306 also includes an adjustment circuit in the form of a counting circuit 315 having inputs accepting the decrement and increment control signals on lines 312 and 314 respectively, maintaining a running total responsive to the decrement and increment control signals, comparing the running total to a predetermined terminal value, and in response to the comparison, supplying the exit control signal 308.

The counting circuit 315 includes a subtracting circuit 316, an adding circuit 318, and a totalizer 320. The subtracting circuit 316 accepts the first decrement control signal and has an output supplying a first predetermined adjustment factor on line 322. The adding circuit 318 accepts the first increment control signal and has an output supplying a second predetermined adjustment on line 324.

The totalizer 320 accepts the first and second adjustment factors and uses them to maintain the running total starting at a predetermined initial value. A second comparing circuit is located within the totalizer 320 in this embodiment. The totalizer 320 compares the running total to the terminal value, and when the running total is greater than, or equal to the terminal value, the totalizer 320 supplies the exit control signal 308. To maintain the running total, the totalizer 320 decrements the running total for each first adjustment and increments the running total for each second adjustment factor. The terminal value can be selected according to the desired performance of the system 300. However, the terminal value should be coordinated with the adjustment factors. That is, the terminal value should be high enough that a series of second adjustment factors (from received input power level sample values below the baseline threshold 235 value), not indicative of consistent operation below the baseline threshold 235, does not cause the running total to equal or exceed the terminal value. In a similar manner, the terminal value should be low enough that a longer series of second adjustment factors indicating consistent operation below the threshold value, does cause the running total to equal or exceed the terminal value.

One issue associated with compiling historical data on the received input power level sample values is the biasing of the running total with received input power sample values above the baseline threshold 235. Potential biasing of the running total is an issue because the running total must be able to respond (approach the terminal value) if the mobile handset operates for a sufficient period of time in an area with poor coverage. This may not be possible if the mobile handset has previously been operating for a period of time in good coverage with the result that a large number of first adjustment cause the running total to move too far below the terminal value.

Returning to FIG. 3, to avoid biasing, the totalizer 320 decrements the running total for each first adjustment factor only if the running total is greater than a predetermined minimum total value. Otherwise, the running count is maintained at the minimum total value until a second adjustment factor is encountered. As with the baseline threshold 235 value and the terminal value, the minimum total value can be selected according to the desired performance of the system 300 and is coordinated with these other values. The totalizer 320 resets the running total to the initial value after supplying the exit control signal.

The assignment of values for the first and second adjustment factors can be selected according to the desired performance of the system 300. The adjustment factors also are coordinated with the threshold value, the terminal value, and the minimum total value. In one aspect of the system 300, the absolute value of the first adjustment factor equals the absolute value of the second adjustment factor. That is, operation of the device above and below the baseline threshold 235 value is given equal weight in the analysis of when to exit the existing coverage area. In FIG. 2, the absolute values of the adjustment factors are shown as being "1". Alternately, unequal weight can be assigned to the adjustment factors to bias the operation of system 300 toward exiting or staying in the existing coverage network. For example, assigning more weight to values below the baseline threshold 235 would result in a quicker exit from the existing coverage network, since the larger second adjustment factors would more rapidly increment the running total to the terminal value.

The simplicity of the above-mentioned system 300 is offset by limitations. Since the received input power level tends to fluctuate rapidly during operation, particularly in Gray Zones, the mobile handset may oscillate between coverage networks. Therefore, in one aspect of the system 300, predetermined supplemental threshold values are included to increase the accuracy and responsiveness of the system 300. The first supplemental threshold 245 is above the baseline threshold 235 as shown in FIG. 2. The second supplemental threshold 250 is below the baseline threshold 235 value as shown in FIG. 2. The supplemental thresholds allow the system 300 to identify received input power level sample values associated with a higher certainty of operation in areas with significantly better or worse coverage.

Therefore, returning to FIG. 3, the first comparison circuit 310 compares received input power level samples to the supplemental threshold values, as well as the baseline threshold 235 value. The first comparison circuit 310 then supplies: the first decrement control signal 312 for each received input power level sample value greater than, or equal to the baseline threshold value and less than, or equal to the first supplemental threshold 245 value; a second decrement control signal, not shown, for each received input power level sample value greater than the first supplemental threshold 245 value; the first increment control signal 314 for each received input power level sample value less than the baseline threshold 235 value and greater than, or equal the second supplemental threshold 250 value; and, a second increment control signal, not shown, for each received input power level sample value less than the second supplemental threshold 250 value.

The subtracting circuit 316 accepts the first and second decrement control signals on line 312, supplies the first adjustment factor in response to the first decrement control signal, and supplies a third predetermined adjustment factor in response to the second decrement control signal. Both adjustment factors are supplied on line 322.

The adding circuit 318 accepts the first and second increment control signals, supplies the second adjustment factor in response to the first increment control signal, and supplies a fourth predetermined adjustment factor in response to the second increment control signal. Both adjustment factors are supplied on line 324.

The totalizer 320 accepts the first, second, third and fourth adjustment factors, decrements the running total for each first and third adjustment factor, and increments the running total for each second and fourth adjustment factor. The totalizer 320 decrements the running total for each first and third adjustment factor only if the running total is greater than the minimum total value.

The third and fourth adjustment factors are larger than the first and second adjustment factors to reflect the greater certainty associated with the third and fourth adjustment factors. Therefore, the running total moves more quickly toward or away from the terminal value in response to these adjustment factors.

In one aspect of the system 300, the absolute value of the third adjustment factor equals the absolute value of the fourth adjustment factor. In FIG. 2, the adjustment factors are shown as being "3". Alternately, unequal weight can be assigned to the adjustment factors to bias the operation of system 300 toward exiting or staying in the existing coverage network. For example, assigning more weight to values below the second supplemental threshold 250 would result in a quicker exit from the existing coverage network, since the larger second adjustment factors would more rapidly increment the running total to the terminal value.

The selection of the supplemental threshold values can have a significant impact on the determination of when to exit the existing coverage area. For example, if the first supplemental threshold 245 is further from the baseline threshold 235 than the second supplemental threshold 250, less weight will be given to received input power level samples in areas of better coverage. In one aspect of the system 300, the absolute value of the first supplemental threshold 245 value equals the absolute value of the second supplemental threshold 250 value as shown in FIG. 2. This results in an equal weighting of received input power level values above and below the baseline threshold 235 value. In one aspect of the system 300, the first supplemental threshold 245 value is +3 dB with respect to the baseline threshold 235 value and the second supplemental threshold 250 value is −3 dB with respect to the baseline threshold 235 value.

While FIG. 2 illustrates three thresholds, and four adjustment factors assigned to each of the four areas divided by the three thresholds, the method can be expanded to include more thresholds. Increasing the thresholds, and thus increasing the number of adjustment factors assigned to areas divided by the thresholds, may increase the sensitivity of the method. The increased sensitivity, however, may be offset by the probable increase in processing. Thus, the method must be tailored to maximize sensitivity, while not over burdening the system's 300 processing capability.

Figure 4:
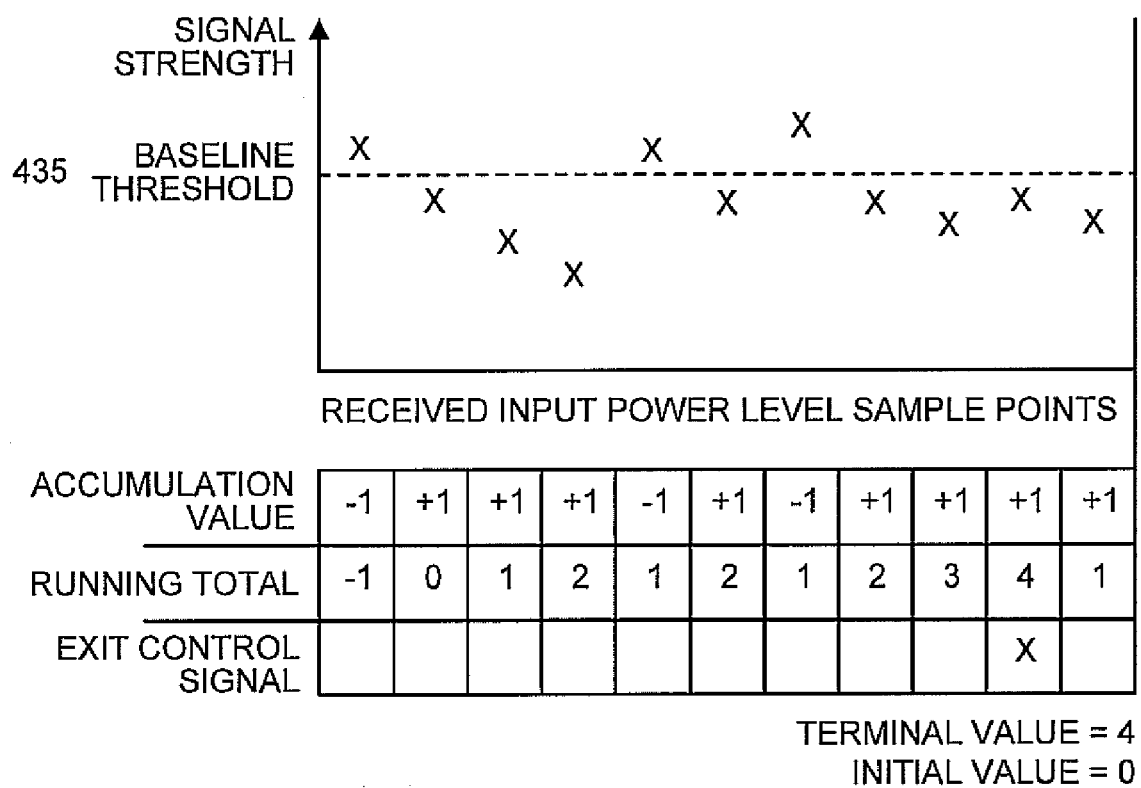
FIG. 4 is a chart illustrating an example of the operation of an embodiment with a baseline threshold.

FIG. 4 is a chart illustrating an example of the operation of the present invention system with a baseline threshold 435. In FIG. 4, the first and second adjustment factors are "−1" and "+1" respectively. FIG. 4 shows: the received input power level sample values compared to the threshold value, adjustment factors assigned to the sample values responsive to the comparison, the running total decremented and incremented using the adjustment factors, the exit control signal activated when the running total equals the terminal value, and the running total reset to the initial value after the exit control signal is activated.

Figure 5:
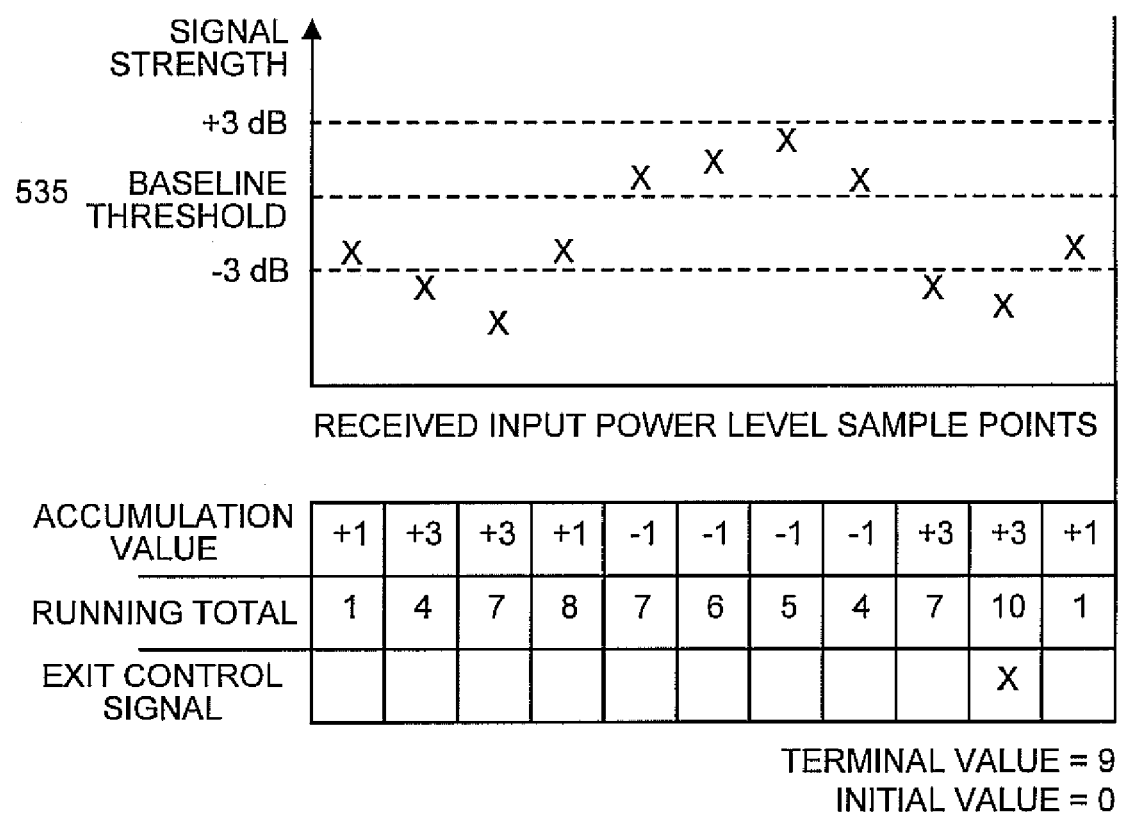
FIG. 5 is a chart illustrating an example of the operation of an embodiment with a baseline threshold and two supplemental thresholds.

FIG. 5 is a chart illustrating an example of the operation of the present invention system with a baseline threshold 535 and two supplemental thresholds. In FIG. 5, the first and second adjustment factors are "−1" and "+1" respectively and the third and fourth adjustment factors are "−3" and "+3" respectively. FIG. 5 shows: the received input power level sample values compared to the baseline threshold 535 and the first and second supplemental threshold values. Additionally, FIG. 5 shows adjustment factors assigned to the sample values responsive to the comparison and the running total decremented and incremented using the adjustment factors. The exit control signal activated when the running total equals the terminal value, and the running total reset to the initial value after the exit control signal is activated are also shown. While the supplemental thresholds shown in FIG. 5 are +/−3 dB from the baseline threshold, it will be appreciated by one of skill in the art that other supplemental threshold values are possible.

While the disclosure above referring to FIGS. 3–5, describes an addition and subtraction method for recording the history of received signals, the method is not limited to addition and subtraction. The method generally adjusts an indicator based on received signals. By then examining the indicator, the system can determine whether to seek an alternate coverage network.

Figure 6:
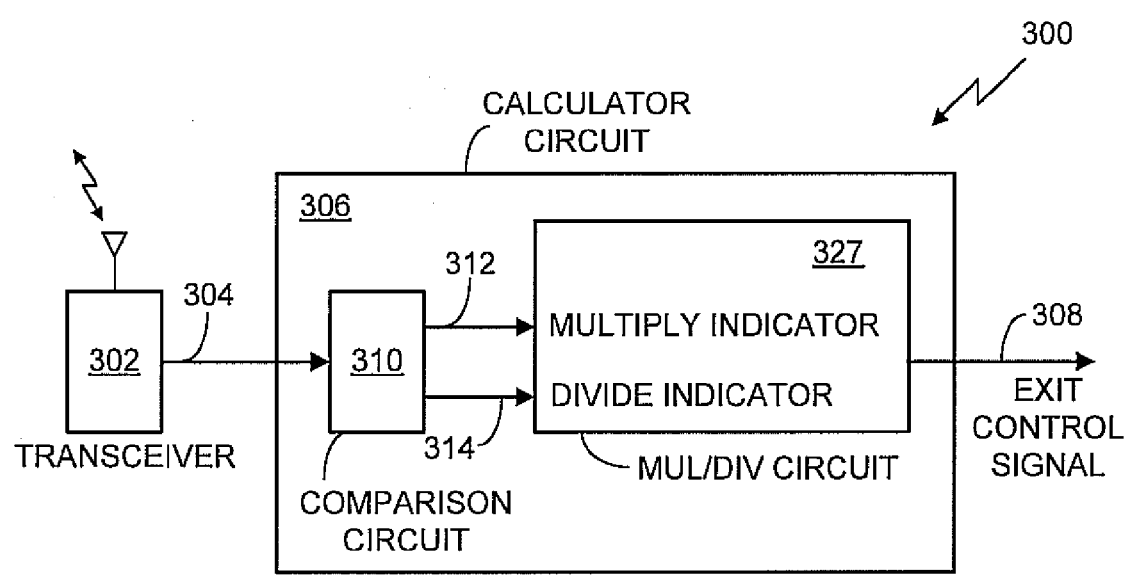
FIG. 6 is a schematic block diagram depicting a system for determining when to exit an existing coverage network.

For example, FIG. 6 is a schematic block diagram depicting the system 600 for determining when to exit an existing coverage network. The structure shown in FIG. 6 is similar to the structure shown in FIG. 3 and described above. FIG. 6 differs in that the adjustment circuit is in the form of a multiply and divide circuit. Instead of maintaining a running counter, the multiply and divide circuit 327 responds differently to signals 312 and 314. For example, the multiply and divide circuit 327 may multiply an indicator by an adjustment factor if it receives a signal on line 312, or divide the indicator by an adjustment factor if it receives a signal on line 314. To illustrate, the multiply and divide circuit 327 may begin with an indicator value of 10. It is the indicator value that is adjusted in the multiply and divide circuit 327 to determine when, and if, to send an exit control signal 308. If the transceiver 302 receives a signal sample that is below the threshold value, the first comparison circuit 310 would send a signal on line 312 to the multiply and divide circuit 327, causing the multiply and divide circuit 327 to multiply the indicator (now 10) by an adjustment factor. For example, the adjustment factor may be 2. Thus, the indicator would now be 20. A second received signal sample is also below the threshold, causing, as just described, the indicator (now 20) to be multiplied by an adjustment factor of 2, resulting in a new indicator value of 40. If a third received signal sample is above, rather than below, the threshold, the first comparison circuit 310 would send a signal on line 314 causing the counting circuit to divide the indicator by the adjustment factor for example, 2. Thus the indicator would now be 20. Later received signals would cause the indicator to increase or decrease. If the indicator reaches a preset value of for example, 100 or more, the multiply and divide circuit 327 would send an exit control signal 308. The multiply and divide circuit 327 resets the running total to the initial value after supplying the exit control signal 308.

To avoid bias associated with being in a good coverage area for many signal samples, the indicator may have preset a minimum value. Returning to FIG. 6, to avoid biasing, the calculator circuit 320 divides the indicator only if the indicator is greater than a predetermined minimum total value. Otherwise, the multiply and divide circuit 327 maintains the indicator at the minimum total value until a second multiplication signal on 312 is encountered. The minimum total value can be selected according to the desired performance of the system.

Also, as with the addition and subtraction method described in FIGS. 3–5, the system depicted in FIG. 6, may vary the multiplication and division adjustment factor depending on the distance from the baseline threshold. Again, this would, for example, cause very poor received signals to affect the indicator more quickly, potentially accelerating the exit control signal 308.

Figure 7:
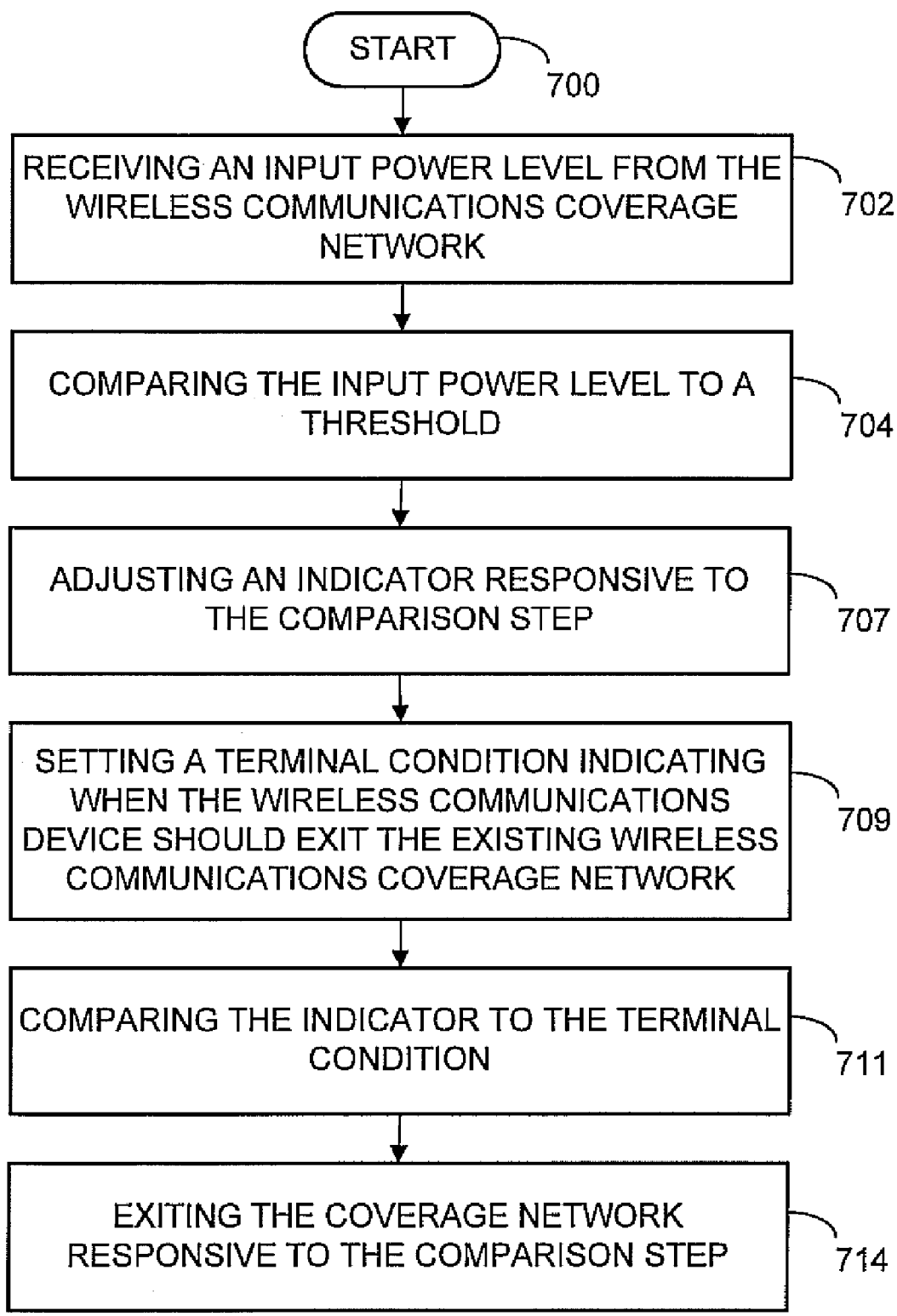
FIG. 7 is a flowchart illustrating a method for determining when to exit an existing coverage network.

FIG. 7 is a flowchart illustrating the method for determining when to exit an existing coverage network. Although the method of FIG. 7 (and FIGS. 8, 9, 10, 12 and 13 below) is depicted as a sequence of numbered steps for clarity, no order should be inferred from the numbering unless explicitly stated. The method starts at Step 700. Step 702 receives an input power level from the wireless communications coverage network. Step 704 compares the input power level to a threshold. Step 707 adjusts an indicator responsive to the comparison step 704. Step 709 sets a terminal condition indicating when the wireless communications device should exit the existing wireless communications coverage network. Step 711 compares the indicator to the terminal condition. Step 714 exits the coverage network responsive to the comparison step.

Figure 8:
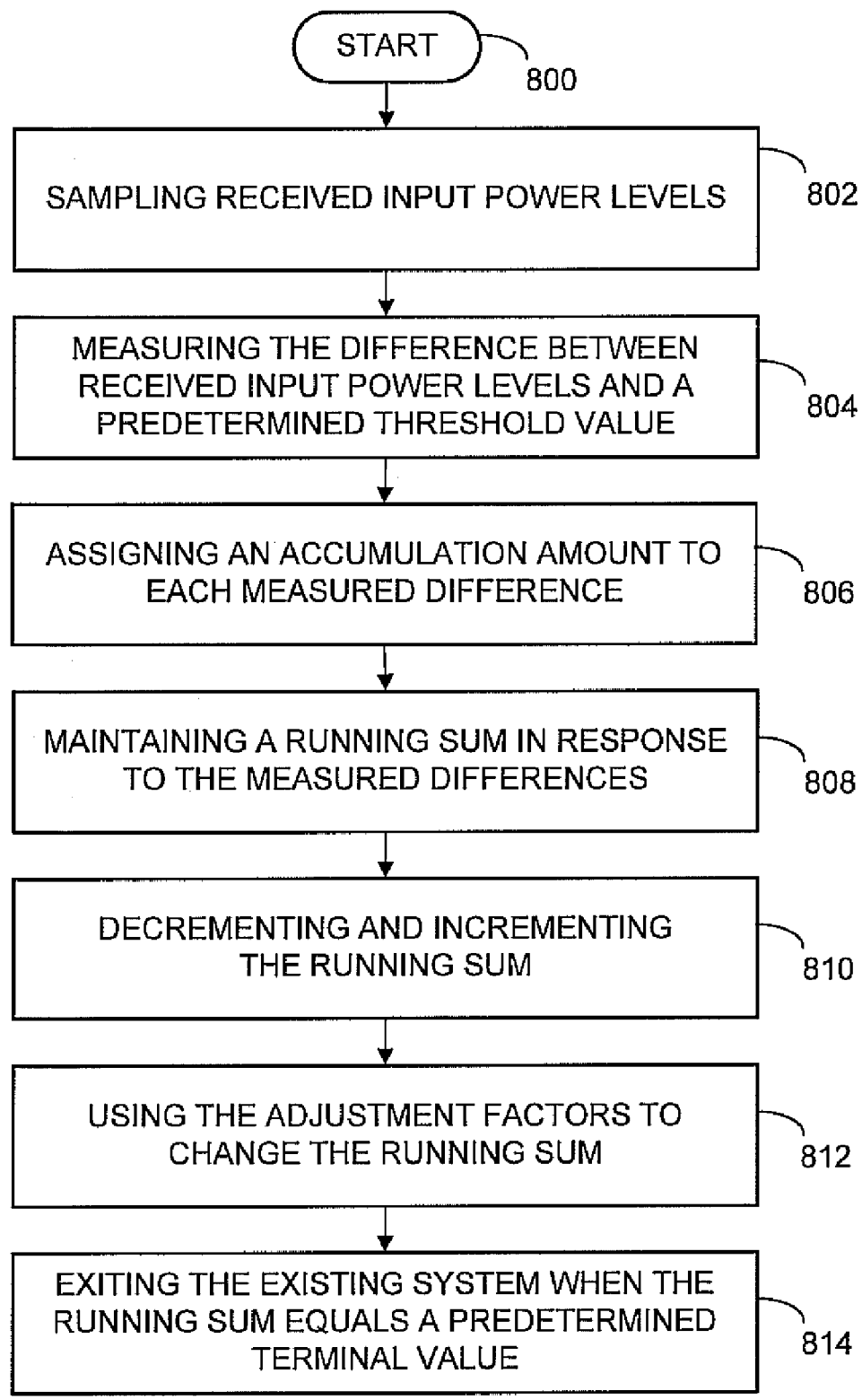
FIG. 8 is a flowchart showing in further detail the method illustrated in FIG. 7 and block diagrammed in FIG. 3.

FIG. 8 is a flowchart showing in further detail the method illustrated in FIG. 7, as applied to the block diagram of FIG. 3. The method starts at 800. Step 802 samples the received input power level. Step 804 measures the difference between each sample point and a predetermined baseline threshold value. Step 806 assigns an adjustment factor to each measured difference. Step 808 maintains a running sum in response to the measured differences. Step 810 decrements the running sum for sample point values greater than the baseline threshold value and increments the running sum for sample point values less than the baseline threshold value. Step 812 uses the adjustment factor to change the running sum. Step 814 exits the existing coverage network when the running sum is greater than, or equal to a predetermined terminal value.

In one aspect of the method, decrementing the running sum for sample point values greater than the baseline threshold value in Step 810 includes decrementing the running sum only if the running sum is greater than a predetermined minimum value.

In one aspect of the method, measuring the difference between each sample point and a predetermined baseline threshold value in Step 804 includes measuring a first difference for a first sample point value greater than the baseline threshold value and a second difference for a second sample point value less than the baseline threshold value. Assigning an adjustment factor to each measured difference in Step 806 includes assigning a first adjustment factor to the first difference and a second adjustment factor to the second difference. Then, decrementing the running sum for sample point values greater than the baseline threshold value in Step 810 includes using the first adjustment factor to decrement the running sum and incrementing the running sum for sample point values less than the baseline threshold value in Step 810 includes using the second adjustment factor to increment the running sum.

In one aspect of the method, the absolute value of the first adjustment factor equals the absolute value of the second adjustment factor. In one aspect of the method, the absolute value of the first difference equals the absolute value of the second difference. In one aspect of the method, the first difference is +3 dB and the second difference is −3 dB with respect to the baseline threshold value.

In one aspect of the method, measuring the difference between each sample point and a predetermined baseline threshold value in Step 804 includes measuring a third difference greater than the first difference and a fourth difference greater than the second difference. That is, the value of the received input power level sample associated with the fourth difference is less than the value of the received input power level sample associated with the second difference. Assigning an adjustment factor to each measured difference in Step 806 includes assigning a third adjustment factor greater than the first accumulation amount to the third difference and a fourth adjustment factor greater than the second accumulation amount to the fourth difference. Then, decrementing the running sum for sample point values greater than the baseline threshold value in Step 810 includes using the third adjustment factor to decrement the running sum and incrementing the running sum for sample point values less than the baseline threshold value in Step 810 includes using the fourth adjustment factor to increment the running sum.

In one aspect of the method, the absolute value of the third adjustment factor equals the absolute value of the fourth adjustment factor. In one aspect of the method, exiting the existing coverage network when the running sum is greater than, or equal to the terminal value in Step 814 includes resetting the running sum to a predetermined initial value after exiting the existing coverage network.

Figure 9:
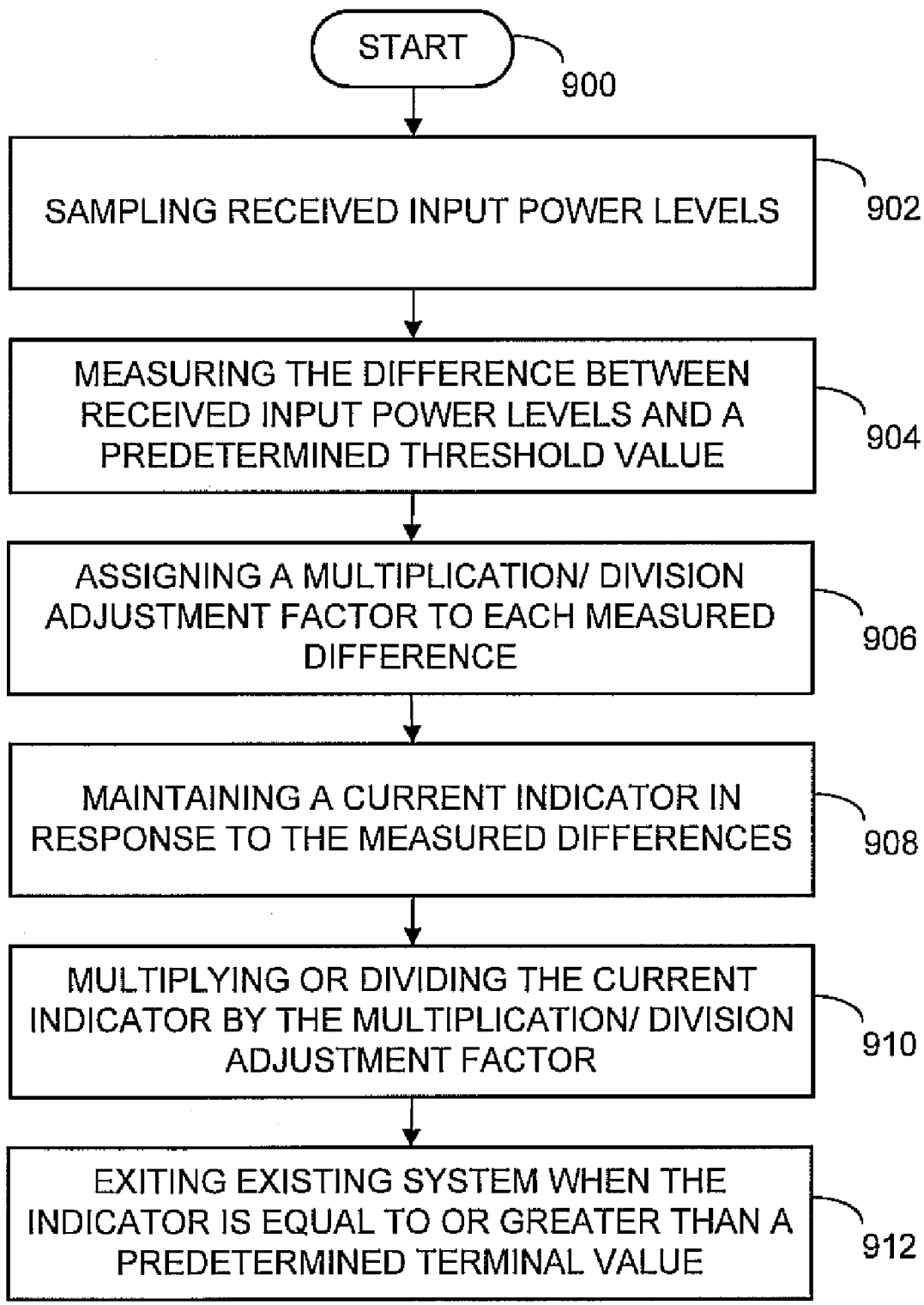
FIG. 9 is a flowchart showing in further detail the method illustrated in FIG. 7 and block diagrammed in FIG. 6.

FIG. 9 is a flowchart showing in further detail a method illustrated in FIG. 7, as applied to the block diagram of FIG. 6. The method starts at 900. Step 902 samples the received input power level. Step 904 measures the difference between each sample point and a predetermined baseline threshold value. Step 906 assigns a division or multiplication adjustment factor to each measured difference. Step 908 maintains a current indicator value in response to the measured differences. Step 910 multiplies the indicator by the division and multiplication adjustment factor for sample point values greater than the baseline threshold value and divides the indicator by the division and multiplication adjustment factor for sample point values less than the baseline threshold value. As described above, Step 910 may have different division and multiplication adjustment factors depending on the distance from the baseline threshold. Step 912 exits the existing coverage network when the indicator is greater than, or equal to a predetermined terminal value.

Figure 10:
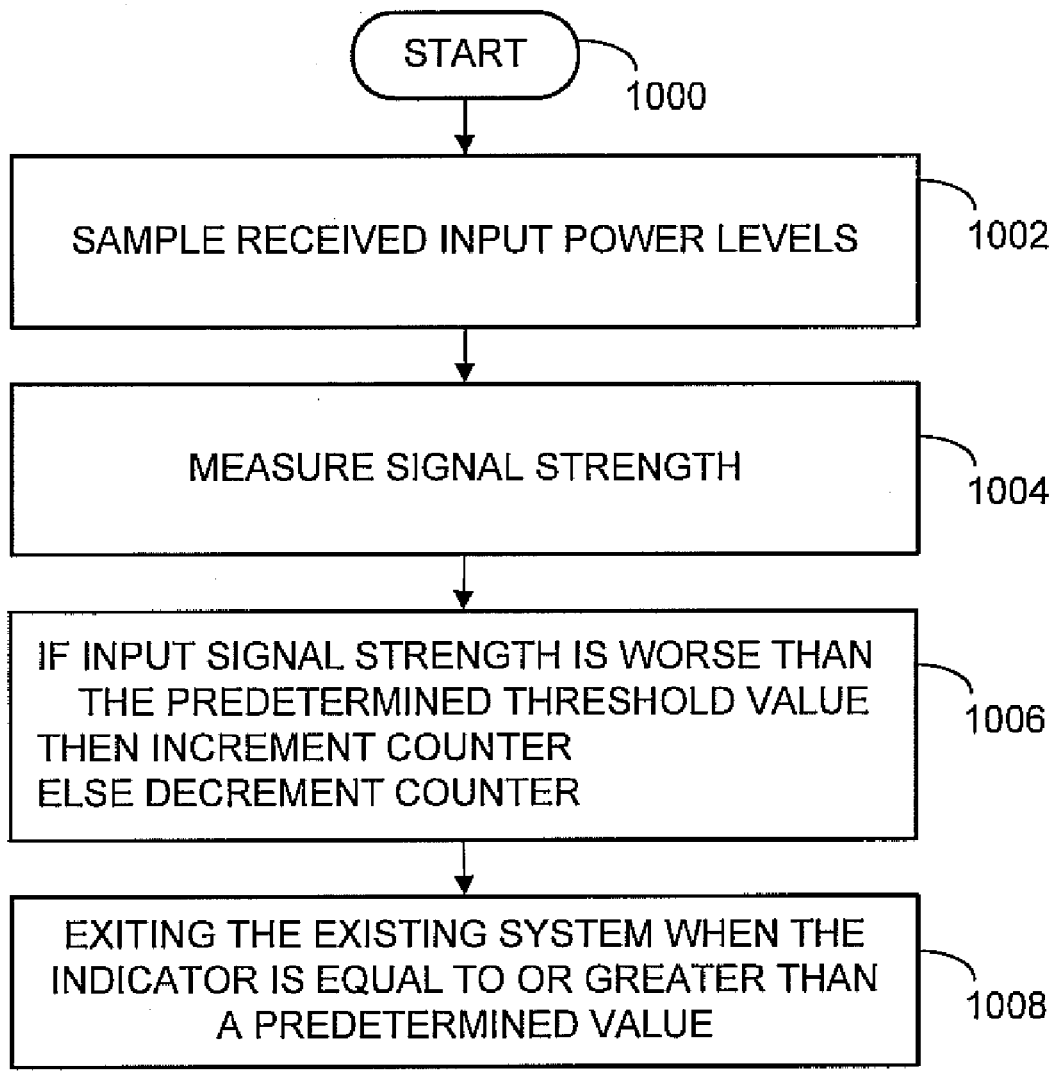
FIG. 10 is a flowchart showing the method of one embodiment illustrated in the block diagram of FIG. 3.

FIG. 10 is a flowchart showing a method of one embodiment illustrated in the block diagram of FIG. 3. The method starts at 1000. Step 1002 samples the received input power level. Step 1004 measures the difference between each sample point and a predetermined baseline threshold value. Step 1006 assigns an addition or subtraction adjustment factor to each measured difference. In this example step 1006 assigns an addition or subtraction of one. Step 1008 exits the existing coverage network when the indicator is greater than, or equal to a predetermined terminal value.

Figure 11:
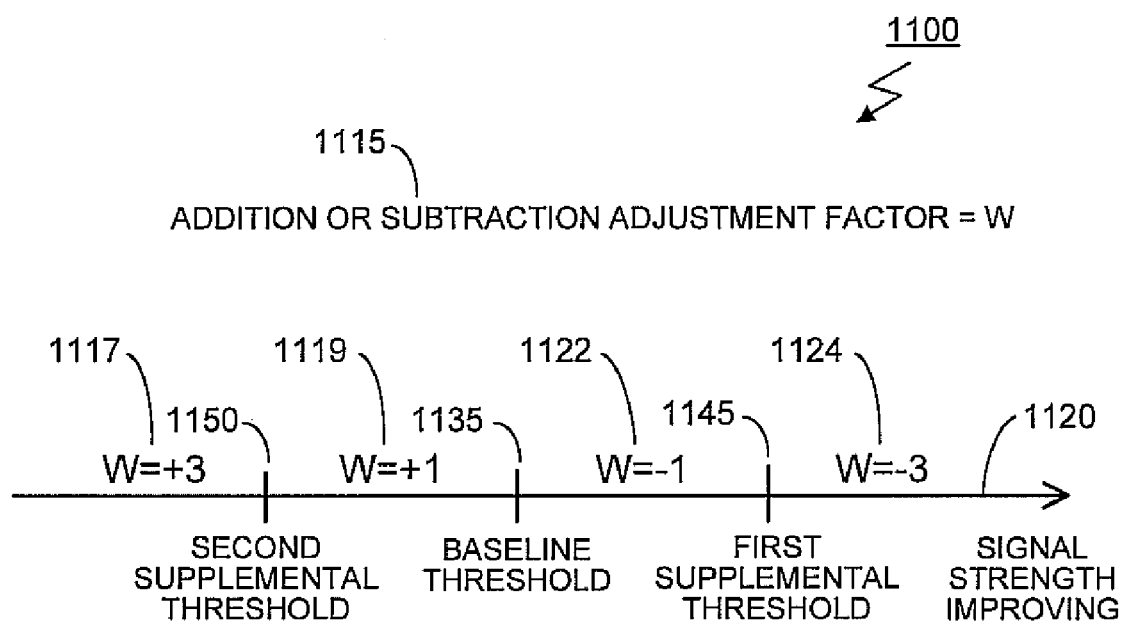
FIG. 11 is a diagram showing the baseline threshold and two supplemental thresholds.

FIG. 11 is a diagram 1100 showing a baseline threshold 1135, a first supplemental threshold 1145, and a second supplemental threshold 1150. The line 1120 on the diagram 1100 indicates improving signal strength as we move from left to right. Additionally, the diagram shows the addition or subtraction adjustment factor 1115, also indicated as "w" for different signal strengths. The accumulation value w=3, 1117; w=1, 1119; w=−1, 1122; and w=−3, 1124. In one embodiment of the invention the supplemental thresholds 1150, 1145 are 3 dB from the baseline threshold.

It should be noted that FIG. 11 is only an example of one embodiment of the invention, different accumulation values are possible. Additionally, the number of supplemental threshold and accumulation values can be increased. While accumulation values 1115 are assigned for specific signal strength ranges in this embodiment accumulations values can also be assigned based on the measured difference between signal strength and a predetermined threshold. An example of this was shown in FIG. 8 wherein the received input power level is indicative of the signal strength.

Figure 12:
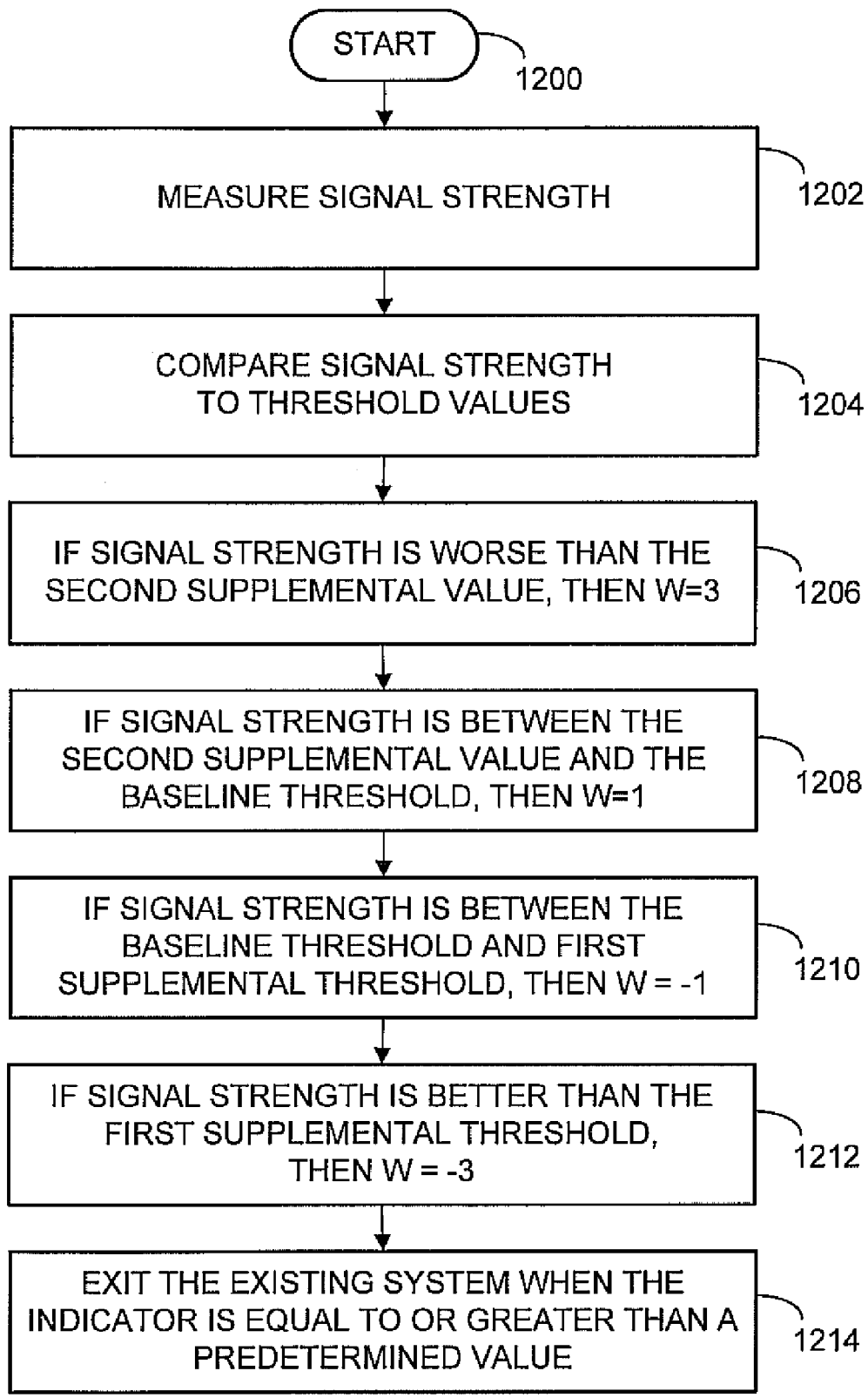
FIG. 12 is a flowchart showing the method of another embodiment illustrated in the block diagram of FIG. 3.

FIG. 12 is a flowchart showing a method of another embodiment illustrated in the block diagram of FIG. 3. Specifically, FIG. 12 shows one way that addition or subtraction adjustment factors can be assigned. The method starts at 1200. Step 1202 measures the received input power level. Step 1204 compares signal strength to the threshold values. Steps 1206, 1208, 1210, 1212 assigns an addition or subtraction adjustment factor to each measured difference. Step 1206 increments the counter by three when the input power is worse than the second supplemental threshold 1150. Step 1208 increments the counter by one if the input power is between the second supplemental threshold 1150 and the baseline threshold 1135. Step 1210 decrements the counter by one if the input power is between the baseline threshold 1135 and the first supplemental threshold 1145. Step 1212 decrements the counter by three when the input power level is better than the first supplemental threshold 1145. Step 1214 exits the existing coverage network when the indicator is greater than, or equal to a predetermined terminal value.

Figure 13:
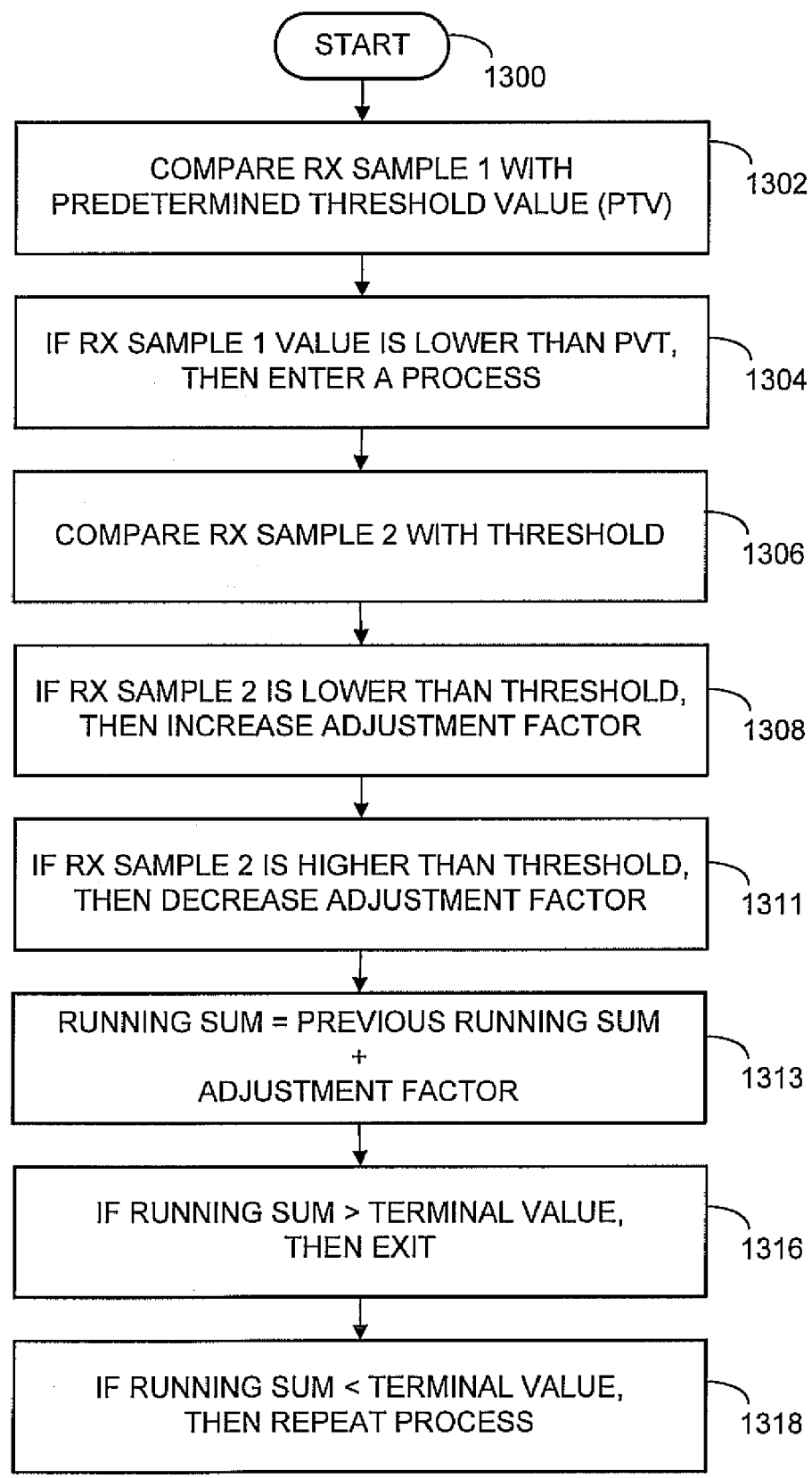
FIG. 13 is a flowchart showing a method of another embodiment.

FIG. 13 is a flow chart showing the method of another embodiment. The method starts at 1300. Step 1302 compares the first received sample signal strength with a predetermined threshold value (PTV). Step 1304 enters a process if the first received sample signal strength s lower than PVT. Step 1306 compares the second received sample signal strength with the threshold. Step 1308 increases an adjustment factor if the second received sample signal strength is lower than the threshold. Step 1311 decreases an adjustment factor if the second received sample signal strength is lower than the threshold. Step 1313 determines a running sum. The running sum is equal to the; previous running sum plus the adjustment factor. Step 1316 exits if the running sum is greater than a terminal value. Step 1318 repeats the process if the running sum is less than the terminal value.

While the methods and systems already discussed are described as increasing a number (i.e., a running counter or indicator) through some adjustment factor (i.e., addition or multiplication) when a signal below a threshold is encountered, the method may also decrease a number through some adjustment factor for signals received below a threshold. For example, in the method described in FIG. 8, the running counter may be decremented for signals received below a threshold at Step 810, and the system may exit when the running sum is less than or equal to a predetermined terminal value at Step 814. Similarly, in the method described in FIG. 9, the indicator may be divided for signals received below a threshold at Step 910, and the system may exit when the indicator is less than or equal to a predetermined terminal value at Step 912.

A system and method are presented for determining when to exit an existing wireless communications coverage network. Examples of the invention have been enabled without supplemental threshold levels, and with a first set of supplemental threshold levels, however, it should be understood that the present invention is not limited to any particular number of supplemental threshold levels. The system and method are applicable to a wide range of wireless communications device configurations including analog communication systems and digital communications systems. Analog communication systems transmit a signal over a transmission path in a continuously variable form as compared to digital communication systems that transmit information over a transmission path in which the information is transmitted as discrete states. Other variations and embodiments of the invention will occur to those skilled in the art.

We claim:

1. In a mobile wireless communications device, a method for determining when to exit an existing wireless communications coverage network, the method comprising:
    (a) receiving an input power level from the wireless communications coverage network;
    (b) comparing the input power level to a threshold;
    (c) adjusting an indicator responsive to the comparison of step (b), the indicator representing a history of the received input power level;
    (d) setting a terminal condition indicating when the wireless communications device should exit the existing wireless communications coverage network;
    (e) comparing the indicator to the terminal condition; and
    (f) exiting the existing coverage network responsive to the comparison of step (e).

2. The method of claim 1 wherein the comparison of step (b) includes:
    (g) sampling the received input power level;
    (h) measuring a first difference between a first sample point of the input power level and the threshold, and associating a first adjustment factor to the first sample point responsive to the first difference; and
    (i) measuring a second difference between a second sample point of the input power level and the threshold, and associating a second adjustment factor to the second sample point responsive to the second difference.

3. The method of claim 2 wherein the first adjustment factor varies responsive to the magnitude of the first difference; and the second adjustment factor varies responsive to the magnitude of the second difference.

4. The method of claim 3 wherein the adjusting step (c) includes:
(j) adding the first adjustment factor to the indicator if the first sample point is greater than the threshold, or subtracting the first adjustment factor from the indicator if the first sample point is less than the threshold; and
(k) adding the second adjustment factor to the indicator if the second sample point is greater than the threshold, or subtracting the second adjustment factor from the indicator if the second sample point is less than the threshold; and
(l) wherein the comparing of step (e) occurs after steps (j) and (k) and further includes determining whether it is true that the indicator satisfies the terminal condition.

5. The method of claim 2 wherein the adjusting step (c) includes:
(j) adding the first adjustment factor to the indicator if the first sample point is greater than the threshold, or subtracting the first adjustment factor from the indicator if the first sample point is less than the threshold; and
(k) adding the second adjustment factor to the indicator if the second sample point is greater than the threshold, or subtracting the second adjustment factor from the indicator if the second sample point is less than the threshold; and
(l) wherein the comparing of step (e) occurs after steps (j) and (k) and further includes determining whether it is true that the indicator satisfies the terminal condition.

6. The method of claim 5 wherein the exiting step (f) includes exiting the existing coverage network if the determining of step (l) is true.

7. The method of claim 2 wherein the adjusting step (c) includes:
(j) multiplying the indicator by the first adjustment factor if the first sample point is greater than the threshold, or dividing the indicator by the first adjustment factor if the first sample point is less than the threshold;
(k) multiplying the indicator by the second adjustment factor if the second sample point is greater than the threshold, or dividing the indicator by the second adjustment factor if the second sample point is less than the threshold;
(l) wherein the comparing of step (e) occurs after steps (j) and (k) and further includes determining whether it is true that the indicator satisfies the terminal condition.

8. The method of claim 7 wherein the exiting step (f) includes exiting the existing coverage network if the determining of step (l) is true.

9. The method of claim 2 wherein the adjusting step (c) includes:
(j) dividing the indicator by the first adjustment factor if the first sample point is greater than the threshold, or multiplying the indicator by the first adjustment factor if the first sample point is less than the threshold;
(k) dividing the indicator by the second adjustment factor if the second sample point is greater than the threshold, or multiplying the indicator by the second adjustment factor if the second sample point is less than the threshold;
(l) wherein the comparing of step (e) occurs after steps (j) and (k) and further includes determining whether it is true that the indicator satisfies the terminal condition.

10. The method of claim 9 wherein the exiting step (f) includes exiting the existing coverage network if the determining of step (l) is true.

11. The method of claim 1 wherein the adjusting step (c) includes:
(j) subtracting the first adjustment factor from the indicator if the first sample point is greater than the threshold, or adding the first adjustment factor to the indicator if the first sample point is less than the threshold; and
(k) subtracting a second adjustment factor from the indicator if the second sample point is greater than the threshold, or adding the second adjustment factor to the indicator if the second sample point is less than the threshold; and
(l) wherein a comparing of step (e) occurs after steps (j) and (k) and further includes determining whether it is true that the indicator satisfies the terminal condition.

12. The method of claim 11 wherein the exiting step (f) includes exiting the existing coverage network if the determining of step (l) is true.

13. The method of claim 1 wherein the adjusting step (c) includes:
(j) multiplying the indicator by the first adjustment factor if the first sample point is greater than the threshold, or dividing the indicator by the first adjustment factor if the first sample point is less than the threshold;
(k) multiplying the indicator by the second adjustment factor if the second sample point is greater than the threshold, or dividing the indicator by the second adjustment factor if the second sample point is less than the threshold;
(l) wherein the comparing of step (e) occurs after steps (j) and (k) and further includes determining whether it is true that the indicator satisfies the terminal condition.

14. The method of claim 13 wherein the exiting step (f) includes exiting the existing coverage network if the determining of step (l) is true.

15. The method of claim 1 wherein the adjusting step (c) includes:
(j) dividing the indicator by the first adjustment factor if the first sample point is greater than the threshold, or multiplying the indicator by the first adjustment factor if the first sample point is less than the threshold;
(k) dividing the indicator by the second adjustment factor if the second sample point is greater than the threshold, or multiplying the indicator by the second adjustment factor if the second sample point is less than the threshold;
(l) wherein the comparing of step (e) occurs after steps (j) and (k) and further includes determining whether it is true that the indicator satisfies the terminal condition.

16. The method of claim 15 wherein the exiting step (f) includes exiting the existing coverage network if the determining of step (l) is true.

17. The method of claim 1 wherein the existing coverage network is a first stationary transceiver and the exiting step (f) further includes switching from the first stationary transceiver to a second stationary transceiver.

18. The method of claim 17 wherein the first stationary transceiver operates in a digital mode and the second stationary transceiver operates in a digital mode.

19. The method of claim 17 wherein the first stationary transceiver operates in a digital mode and the second stationary transceiver operates in an analog mode.

20. The method of claim 17 wherein the first stationary transceiver operates in an analog mode and the second stationary transceiver operates in a digital mode.

21. The method of claim 17 wherein the first stationary transceiver operates in an analog mode and the second stationary transceiver operates in an analog mode.

22. The method of claim 1 further comprising comparing the input power level to a supplemental threshold.

23. The method of claim 22 wherein the threshold and the supplemental threshold are selected based on properties of a probability density function of the input power level.

24. The method of claim 23 wherein the probability density function comprises a Gaussian distribution.

25. The method of claim 22 wherein the supplemental threshold is an integral number of standard deviations of the probability density function from the threshold.

26. In a mobile wireless communications device, a method for determining when to exit an existing wireless communications coverage network, the method comprising:
    (a) receiving an input power level from the wireless communications coverage network;
    (b) comparing the input power level to a threshold;
    (c) means for adjusting an indicator responsive to the comparison of step (b), the indicator representing a history of the received input power level;
    (d) setting a terminal condition indicating when the wireless communications device should exit the existing wireless communications coverage network;
    (e) comparing the indicator to the terminal condition; and
    (f) exiting the existing coverage network based on the comparison of step (e).

27. The method of claim 26 wherein the comparison of step (b) includes:
    (g) sampling the received input power level;
    (h) measuring a first difference between a first sample point of the input power level and the threshold, and associating a first adjustment factor to the first sample point responsive to the first difference; and
    (i) measuring a second difference between a second sample point of the input power level and the threshold, and associating a second adjustment factor to the second sample point responsive to the second difference.

28. In a mobile wireless communications device, a system for determining when to exit an existing wireless communications coverage network, the system comprising:
    a transceiver adapted to receive input power levels from the wireless communications coverage network, wherein the transceiver outputs a received input power levels signal;
    a first comparing circuit adapted to receive the received input power levels signal, wherein the first comparing circuit outputs a comparison signal responsive to the comparison of the input power levels signal to a threshold;
    an adjustment circuit adapted to receive the comparison signal, wherein the adjustment circuit adjusts a indicator responsive to the comparison signal, the indicator representing a history of the received input power level; and
    a second comparing circuit that compares the indicator to a terminal condition, wherein the second comparing circuit causes the mobile wireless communications device to exit the existing coverage network when the indicator satisfies the terminal condition.

29. The system of claim 28, wherein the received input power levels signal includes a first sample level and a second sample level;
    wherein the first comparison circuit measures a first difference between the first sample level and the threshold, and associates a first adjustment factor to the first sample level responsive to the first difference;
    wherein the first comparison circuit measures a second difference between the second sample level and the threshold, and associates a second adjustment factor to the second sample level responsive to the second difference; and
    wherein the comparison signal includes the first adjustment factor and the second adjustment factor.

30. The system of claim 29 wherein the adjustment circuit
    adds the first adjustment factor from the indicator if the first sample level is greater than the threshold,
    subtracts the first adjustment factor to the indicator if the first sample level is less than the threshold;
    adds the second adjustment factor from the indicator if the second sample level is greater than the threshold, and
    subtracts the second adjustment factor to the indicator if the second sample level is less than the threshold.

31. The system of claim 29 wherein the adjustment circuit
    multiplies the indicator by the first adjustment factor from the indicator if the first sample level is greater than the threshold;
    divides the indicator by the first adjustment factor from the indicator if the first sample level is less than the threshold;
    multiplies the indicator by the second adjustment factor from the indicator if the second sample level is greater than the threshold; and
    divides the indicator by the second adjustment factor from the indicator if the second sample level is less than the threshold.

32. The system of claim 29 wherein the adjustment circuit
    divides the indicator by the first adjustment factor from the indicator if the first sample level is greater than the threshold;
    multiplies the indicator by the first adjustment factor from the indicator if the first sample level is less than the threshold;
    divides the indicator by the second adjustment factor from the indicator if the second sample level is greater than the threshold; and
    multiplies the indicator by the second adjustment factor from the indicator if the second sample level is less than the threshold.

33. The system of claim 29 wherein the first adjustment factor varies responsive to the first adjustment factor varies responsive to the magnitude of the first difference; and the second adjustment factor varies responsive to the magnitude of the second difference.

34. The system of claim 33 wherein the adjustment circuit
    subtracts the first adjustment factor from the indicator if the first sample level is greater than the threshold,
    adds the first adjustment factor to the indicator if the first sample level is less than the threshold;
    subtracts the second adjustment factor from the indicator if the second sample level is greater than the threshold, and
    adds the second adjustment factor to the indicator if the second sample level is less than the threshold.

35. The system of claim 33 wherein the adjustment circuit
multiplies the indicator by the first adjustment factor from
the indicator if the first sample level is greater than the
threshold;
divides the indicator by the first adjustment factor from
the indicator if the first sample level is less than the
threshold;
multiplies the indicator by the second adjustment factor
from the indicator if the second sample level is greater
than the threshold; and
divides the indicator by the second adjustment factor from
the indicator if the second sample level is less than the
threshold.

36. The system of claim 33 wherein the adjustment circuit
divides the indicator by the first adjustment factor from
the indicator if the first sample level is greater than the
threshold;
multiplies the indicator by the first adjustment factor from
the indicator if the first sample level is less than the
threshold;
divides the indicator by the second adjustment factor from
the indicator if the second sample level is greater than
the threshold; and
multiplies the indicator by the second adjustment factor
from the indicator if the second sample level is less than
the threshold.

37. The system of claim 33 wherein the adjustment circuit
adds the first adjustment factor from the indicator if the
first sample level is greater than the threshold,
subtracts the first adjustment factor to the indicator if the
first sample level is less than the threshold;
adds the second adjustment factor from the indicator if the
second sample level is greater than the threshold, and
subtracts the second adjustment factor to the indicator if
the second sample level is less than the threshold.

38. The system of claim 29 wherein the adjustment circuit
subtracts the first adjustment factor from the indicator if
the first sample level is greater than the threshold,
adds the first adjustment factor to the indicator if the first
sample level is less than the threshold;
subtracts the second adjustment factor from the indicator
if the second sample level is greater than the threshold,
and
adds the second adjustment factor to the indicator if the
second sample level is less than the threshold.

* * * * *